(12) United States Patent
Spisak et al.

(10) Patent No.: US 9,735,582 B2
(45) Date of Patent: Aug. 15, 2017

(54) SYNCHRONOUS CONDENSER

(71) Applicant: Electromechanical Engineering Associates, Inc., Pittsburgh, PA (US)

(72) Inventors: Andrew J. Spisak, Jefferson Hills, PA (US); Alan J. Spisak, Monroeville, PA (US)

(73) Assignee: Electromechanical Engineering Associates, Inc., Pittsburg, PA (US)

( * ) Notice: Subject to any disclaimer, the term of this patent is extended or adjusted under 35 U.S.C. 154(b) by 221 days.

(21) Appl. No.: 14/744,728

(22) Filed: Jun. 19, 2015

(65) Prior Publication Data

US 2015/0372491 A1 Dec. 24, 2015

Related U.S. Application Data

(60) Provisional application No. 62/014,391, filed on Jun. 19, 2014.

(51) Int. Cl.

| | |
|---|---|
| *H02J 1/00* | (2006.01) |
| *H02J 3/38* | (2006.01) |
| *H02J 3/40* | (2006.01) |
| *H02P 9/04* | (2006.01) |
| *H02P 23/26* | (2016.01) |

(52) U.S. Cl.
CPC ............... *H02J 3/40* (2013.01); *H02P 9/04* (2013.01); *H02P 23/26* (2016.02); *Y10T 307/549* (2015.04)

(58) Field of Classification Search
CPC ..... H02J 1/102; H02J 1/10; H02J 3/14; G06F 1/26; H02M 3/1584

USPC ............................................. 307/52; 322/32
See application file for complete search history.

(56) References Cited

U.S. PATENT DOCUMENTS

| | | | | |
|---|---|---|---|---|
| 2012/0306458 A1* | 12/2012 | Fogarty | ..................... | H02P 9/08 322/32 |
| 2015/0123623 A1* | 5/2015 | Gulen | ..................... | H02P 9/14 322/20 |

* cited by examiner

*Primary Examiner* — Quan Tra
(74) *Attorney, Agent, or Firm* — Michael Best & Friedrich LLP

(57) ABSTRACT

A method of controlling reactive power in a power generation system that includes a grid and a cross compound turbine generator system having a first turbine arranged to drive a first generator and a second turbine arranged to drive a second generator includes replacing the first turbine with a motor, the motor coupled to the first generator and operable to drive the first generator. The method also includes decoupling the second turbine and the second generator to allow the second generator to rotate separate from the second turbine, connecting an electrical output of the first generator to the second generator, and powering the motor to drive the first generator and to synchronize the first generator to the grid. The method further includes providing electrical power to the second generator from the first generator to power the second generator and synchronize the second generator to the grid and varying an excitation voltage for one of the first generator and the second generator to vary the reactive power output of the first generator and the second generator.

20 Claims, 4 Drawing Sheets

SYNCHRONOUS CONDENSER

BACKGROUND

Power generation and distribution includes the generation of real power Reactive power describes the background energy movement in an Alternating Current (AC) system arising from the production of electric and magnetic fields. These fields store energy which changes through each AC cycle. Devices which store energy by virtue of a magnetic field produced by a flow of current are said to absorb reactive power; those which store energy by virtue of electric fields are said to generate reactive power.

Power flows, both actual and potential, must be carefully controlled for a power system to operate within acceptable voltage limits. Reactive power flows can give rise to substantial voltage changes across the system, which means that it is necessary to maintain reactive power balances between sources of generation and points of demand on a zonal basis. Unlike system frequency, which is consistent throughout an interconnected system, voltages experienced at points across the system form a "voltage profile" which is uniquely related to local generation and demand at that instant, and is also affected by the prevailing system network arrangements. Improperly regulated reactive power can lead to damage of equipment and can require increased sizing of conductors in equipment to carry both the real power and the reactive power.

SUMMARY

The present invention provides a system and method for converting pre-existing cross compound turbine generator unit to a synchronous condenser. The system includes a single motor coupled to a first generator and operable to accelerate the generator from a first speed to a synchronous speed. A variable frequency drive powers the motor at any speed between the first speed and synchronous speed. A second generator is electrically coupled to the first generator and accelerates to its synchronous speed with the first generator, the motor being the sole source of power between the first speed and synchronous speed.

In one construction, a method of controlling reactive power in a power generation system that includes a grid and a cross compound turbine generator system having a first turbine arranged to drive a first generator and a second turbine arranged to drive a second generator includes replacing the first turbine with a motor, the motor coupled to the first generator and operable to drive the first generator. The method also includes decoupling the second turbine and the second generator to allow the second generator to rotate separate from the second turbine, connecting an electrical output of the first generator to the second generator, and powering the motor to drive the first generator and to synchronize the first generator to the grid. The method further includes providing electrical power to the second generator from the first generator to power the second generator and synchronize the second generator to the grid and varying an excitation voltage for one of the first generator and the second generator to vary the reactive power output of the first generator and the second generator.

In another construction, a cross compound synchronous condenser for use in controlling reactive power on an electrical grid includes a first generator, a motor mechanically coupled to the first generator and operable to drive the first generator to a synchronous speed, and a second generator electrically coupled to the first generator, the second generator rotating in response to the receipt of power from the first generator. A first generator excitation system is operable to vary a generator excitation voltage to control the reactive power produced by or used by the first generator and a second generator excitation system is operable to vary a generator excitation voltage to control the reactive power produced by or used by the second generator.

In another construction, a synchronous condenser for use in controlling reactive power on an electrical grid includes a first generator, a motor mechanically coupled to the first generator and operable to drive the first generator to a synchronous speed, and a second generator electrically coupled to the first generator, the second generator rotating in response to the receipt of power from the first generator. A first generator excitation system is operable to vary a generator excitation voltage to control the reactive power produced by or used by the first generator and a second generator excitation system is operable to vary a generator excitation voltage to control the reactive power produced by or used by the second generator.

Other aspects of the invention will become apparent by consideration of the detailed description and accompanying drawings.

Figure 1:
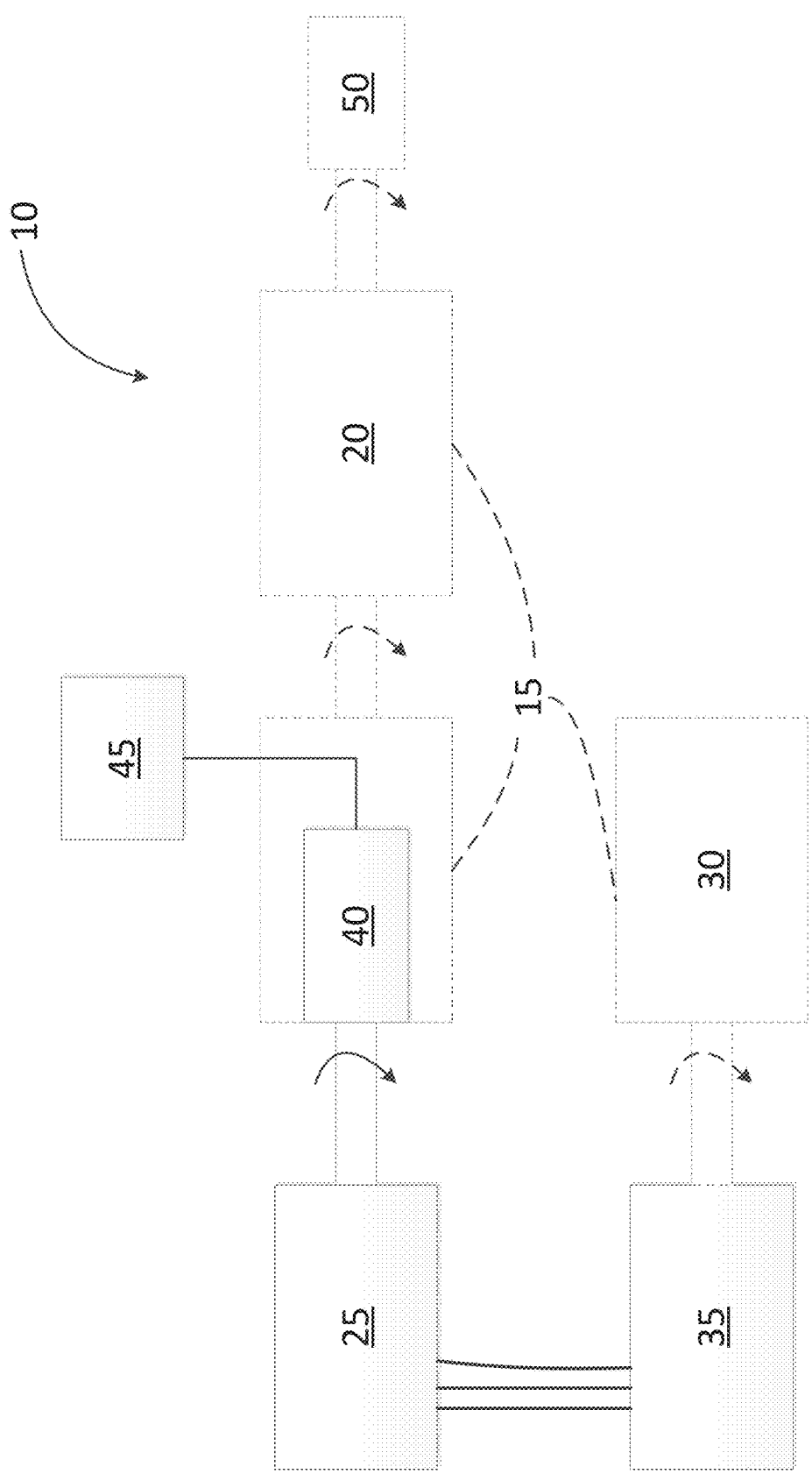
FIG. 1 is a schematic illustration of a retrofit project in including a cross compound turbine generator converted to a motor driven synchronous condenser.
Figure 2:
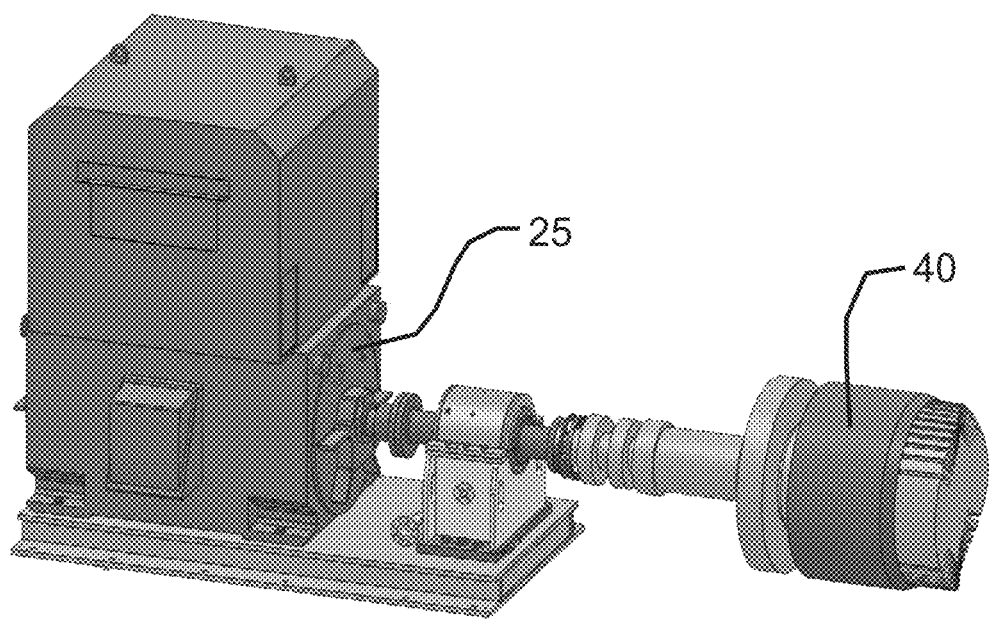
FIG. 2 is a perspective view of a motor coupled to a generator.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Utilities today devote considerable attention to managing voltage levels and reactive power (VAR) throughout the power transmission and distribution systems. Loads that contain capacitors and inductors, such as electric motors, pool pumps, and the power supplies in modern electronics put additional strain on the grid, as the reactive portion of these loads causes them to draw more current than an otherwise comparable resistive load (such as a light bulb)

would draw for the same amount of real power (kilowatts) transferred. This extra current causes additional heat in system components, which wastes energy and reduces service lifetime. Uncorrected reactive power makes it harder to stabilize grid voltage and drives additional cost throughout the entire grid since each component (e.g., conductors, transformers, and generators) must be sized to carry the total power.

The more reactive power flowing on a line, the less "room" there is for real power, and the less efficient the transmission and/or distribution system will be. Thus, utilities and other power generators attempt to control, and preferably minimize the amount of reactive power on a given transmission line.

Utilities currently use devices such as capacitor banks and special transformers that are typically located at substations or on feeders to control reactive power or VARs. In addition, synchronous generators can be used to control reactive power. By varying the excitation of the generator, the generator can be made to absorb reactive power (under-excited) or to supply reactive power (over-excited) to the system as may be required. Typically, an automatic voltage regulator controls the generator excitation to maintain the desired voltage and power factor (ratio of real power to reactive power) as desired.

However, the recent growth of distributed generation, and particularly distributed generation from small generators such as wind and solar generation, and the reduction of large centralized generators have made the control of reactive power more difficult.

The device and conversion method described herein solves the problem of controlling reactive power by utilizing an abandoned or decommissioned generator to control reactive power without maintaining the original prime mover and the associated boiler or thermal plant.

In order to meet clean air standards many older centralized thermal power plants, such as coal-fired units are being retired. The lost power generation is replaced with newer, but smaller thermal plants or by smaller distributed energy sources such as wind farms, solar facilities, bio-mass facilities and the like. The retired centralized power plants not only provided power (Megawatts), they also controlled or supplied reactive power (VARS). This reactive power is still needed on the transmission and distribution system to maintain system voltage.

One way to continue to provide the reactive power control is to convert the generators into synchronous condensers. In a converted synchronous condenser, the prime mover, typically a steam turbine, is used to synchronize the generator to the utility grid and then the turbine is disconnected or at least unpowered while the generator continues to spin on line. The appropriate excitation from an automatic voltage regulator (AVR) is applied to the spinning generator to control the reactive power at the plant.

However, using the prime mover to accelerate and synchronize the generator requires that the turbine and its associated hardware and thermal systems be operational. Thus, a boiler, a condenser, feed water pumps, fuel, etc. are all required to start the generator and synchronize it to the grid. For small turbines, a motor may be used to replace the turbine.

Figure 3:
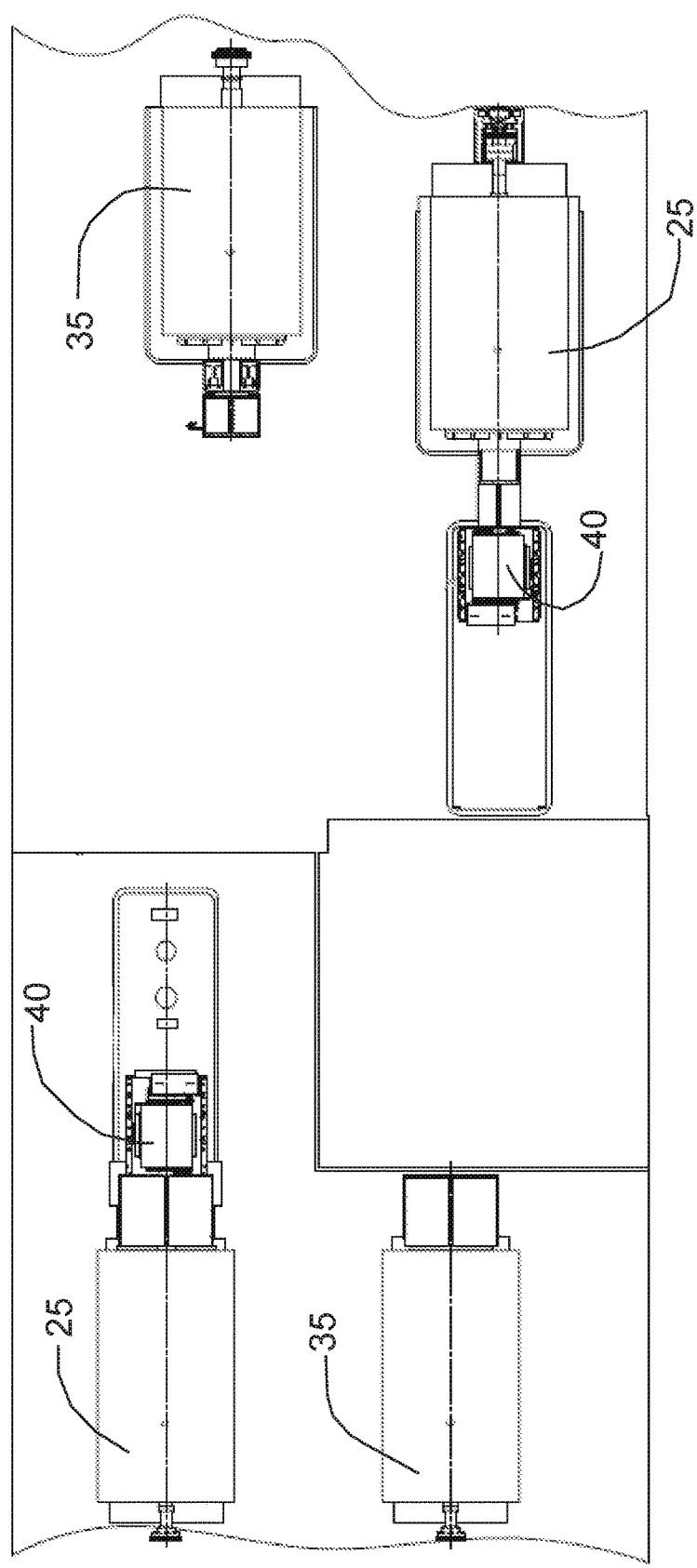
FIG. 3 is top view of another retrofit project in including a cross compound turbine generator converted to a motor driven synchronous condenser.

A common power plant design 10 illustrated schematically in FIG. 1 includes a cross compound 15 turbine in which a high pressure turbine 20 drives a first generator 25 and a low pressure turbine 30 drives a second separate generator 35 with no mechanical connection between the two generators 25, 35. Turbines 15 such as this can be rated at 250 MVA or more. In some arrangements both generators 25, 35 operate at the same speed (typically 3600 RPM). However, some constructions may operate one generator at a high speed (typically the high pressure generator 25) and the second generator 35 at a lower speed (typically 1800 RPM). FIG. 3 illustrates a cross compound turbine 15 that includes the first generator 25 and the second separate generator 35 with no mechanical connection between the two generators 25, 35. The turbine components have been removed in FIG. 3.

Before proceeding, it should be noted that the description contained herein refers to a cross compound turbine generator arrangement and the conversion of that arrangement to a synchronous condenser. However, the invention should not be limited to this arrangement alone and could be applied to any generator arrangement that includes two or more generators that can be electrically coupled. For example, the conversion could be applied to two separate generator sets if the generators can be electrically connected in a manner that allows one generator to provide power to the second generator to allow it to operate as a motor to accelerate to synchronous speed. In addition, the invention could be applied to generators driven by any prime mover so long as the prime mover of one of the generators can be replaced by a motor that is capable of driving the generator to synchronous speed and that generator can be electrically connected to one or more other generators to provide power to accelerate those generators to synchronous speed.

With continued reference to FIG. 1 and FIG. 3, the power plant design also includes a drive motor 40, and preferably an induction motor, connected to the high pressure generator shaft to replace the prime mover. A variable frequency drive (VFD) 45 is connected to the motor 40 to allow the motor 40 to operate at any speed between rest (i.e., turning gear speed) and synchronous speed (i.e., 3600 RPM). In some constructions, a transformer is included in the system to provide power to the VFD 45 and the motor 40 at the desired voltage. It should be noted that variances of the applied frequency from the synchronous speed of the motor 40 can be damaging to the motor 40. Thus, some constructions may include one or more pony motors that accelerate the first generator 25 from turning gear speed to a sufficient speed to allow the motor 40 to smoothly accelerate the first generator 25 to synchronous speed.

Figure 4:
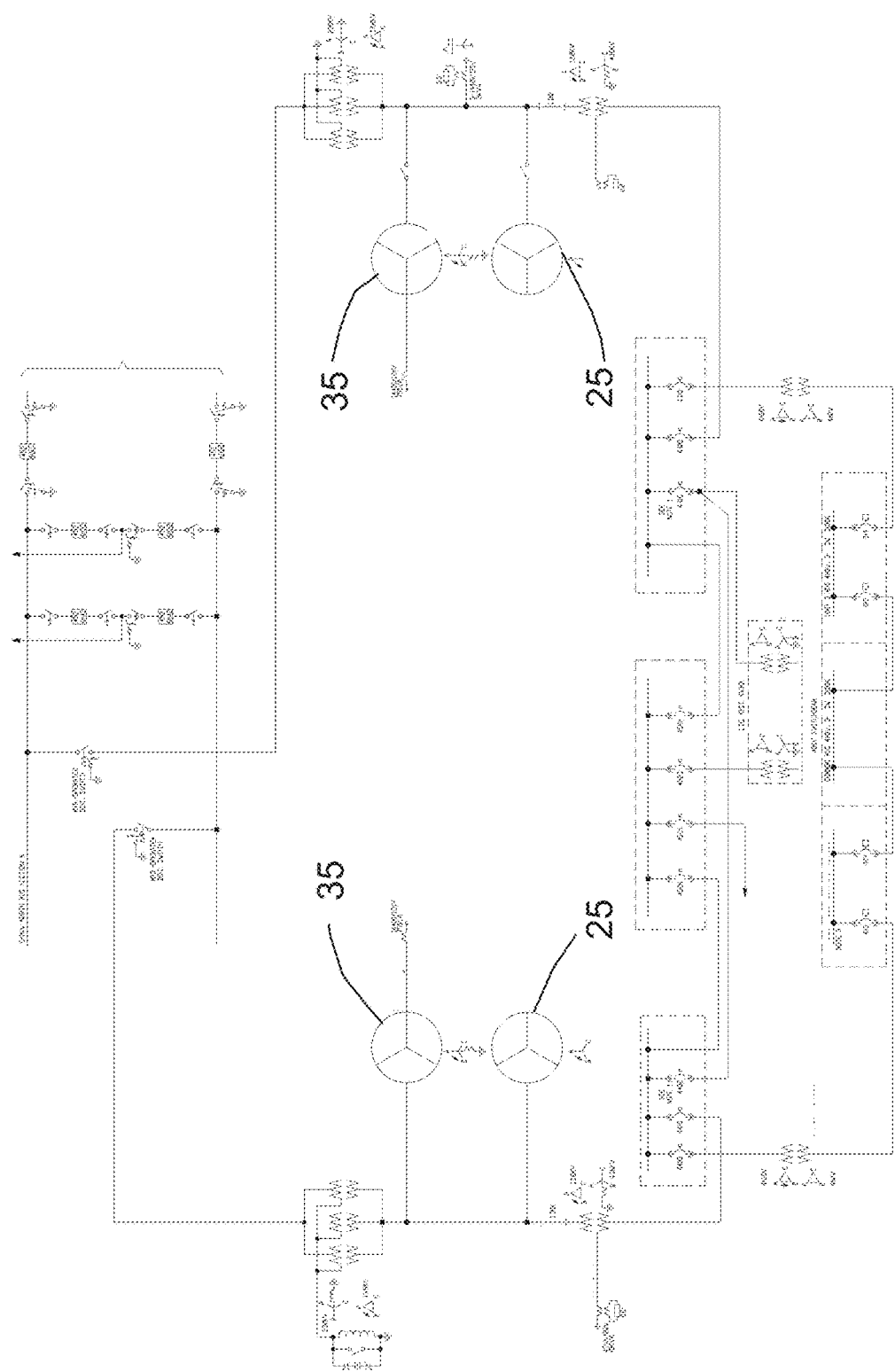
FIG. 4 is an electrical line drawing showing the connections between the generators and motor of the retrofit project of FIG. 1 and FIG. 3.

As illustrated in FIG. 4, the electrical output of first generator 25 is connected to the second generator 35 to operate the second generator 35 as a synchronous motor to accelerate the second generator 35 with the first generator 25. Thus, the first generator 25 and the second generator 35 are electromagnetically coupled. The line frequencies for the two generators 25, 35 are identical and remain in phase during the accelerating process. The excitation for the rotors is maintained on a constant Volts/Hz basis such that both machines are at rated voltage at rated speed. At rated speed the phase can be adjusted to match the grid and the two generators 25, 35 are synchronized to the grid. The drive motor 40 is then powered down but remains physically connected to the first generator 25 such that the motor 40 and the first generator 25 continue to spin together. In some constructions, a clutching mechanism is provided between the motor 40 and the first generator 25 to allow the motor 40 to disengage from the first generator 25.

The constructions illustrated in FIG. 1 and FIG. 3 advantageously require only one motor 40 per unit. The first generator 25 and the second generator 35 are typically electromagnetically coupled before the conversion therefore requiring no new connections. The start-up is similar to the normal start-up of the steam turbine as the high pressure turbine 20 typically provides most of the accelerating power.

Other system modifications required to successfully convert these generators 25, 35 to synchronous condensers include providing a new double acting thrust bearing as the original thrust bearing was part of the turbine that is replaced.

The addition of the thrust bearings and disconnection of the generators 25, 35 from the turbines affects the generator rotor dynamics. To reduce the likelihood of excessive vibration, the thrust bearings also include radial bearings. In addition, two new lower torque turning gears can replace the existing turning gears to avoid vibration problems that might be caused by an oversized turning gear.

Prior to the conversion, the lubrication system provided lubricating oil to the governor system and the bearings for the generator and the turbine. With the turbine removed, the system size can be reduced. As such, a new smaller pump that is properly sized for the generators and auxiliary systems is installed. Unused components, such as the governor 50, can be removed or capped.

An oil heating system is also installed to maintain the oil at a desired temperature. Prior to the conversion, heating was provided by the thermal plant (i.e., the boiler). However, with the thermal plant decommissioned, a new source of heating is needed.

In addition, since the drive motor is always connected to the first generator, the motor will continue to turn when the generator is on its turning gear. To reduce the likelihood that this constant rotation will damage the motor bearings, the bearings are modified for hydrostatic oil lift. The oil lift operates automatically at speeds below a set point.

As one of ordinary skill will realize, many of the features, components, and methods described herein with respect to one embodiment are equally applicable to other or all of the embodiments. As such, the features, components, or methods described with respect to one embodiment should not be limited to that embodiment alone.

What is claimed is:

1. A method of controlling reactive power in a power generation system that includes a grid and a cross compound turbine generator system having a first turbine arranged to drive a first generator and a second turbine arranged to drive a second generator, the method comprising:
   replacing the first turbine with a motor, the motor coupled to the first generator and operable to drive the first generator;
   decoupling the second turbine and the second generator to allow the second generator to rotate separate from the second turbine;
   connecting an electrical output of the first generator to the second generator;
   powering the motor to drive the first generator and to synchronize the first generator to the grid;
   providing electrical power to the second generator from the first generator to power the second generator and synchronize the second generator to the grid; and
   varying an excitation voltage for one of the first generator and the second generator to vary the reactive power output of the first generator and the second generator.

2. The method of claim 1, wherein the motor includes an induction motor.

3. The method of claim 1, wherein the motor includes a variable frequency drive and wherein the frequency provided to the motor is varied to vary the speed of the motor.

4. The method of claim 1, wherein the varying the excitation voltage step includes automatically varying the excitation voltage with an automatic voltage regulator.

5. The method of claim 1, further comprising coupling the first generator to a first double acting thrust bearing.

6. The method of claim 5, wherein the first double acting thrust bearing includes a radial bearing.

7. The method of claim 5, further comprising coupling the second generator to a second double acting thrust bearing.

8. The method of claim 7, wherein the second double acting thrust bearing includes a radial bearing.

9. The method of claim 1, further comprising providing an oil heating system, heating a flow of lubricating oil within the oil heating system, and delivering the heated oil to the first generator and the second generator to provide lubrication.

10. A cross compound synchronous condenser for use in controlling reactive power on an electrical grid, the cross compound synchronous condenser comprising:
    a first generator;
    a motor mechanically coupled to the first generator and operable to drive the first generator to a synchronous speed;
    a second generator electrically coupled to the first generator, the second generator rotating in response to the receipt of power from the first generator;
    a first generator excitation system operable to vary a generator excitation voltage to control the reactive power produced by or used by the first generator; and
    a second generator excitation system operable to vary a generator excitation voltage to control the reactive power produced by or used by the second generator.

11. The cross compound synchronous condenser of claim 10, wherein the motor includes an induction motor.

12. The cross compound synchronous condenser of claim 10, wherein the motor includes a variable frequency drive and wherein the frequency provided to the motor is varied to vary the speed of the motor.

13. The cross compound synchronous condenser of claim 10, wherein the first generator excitation system includes an automatic voltage regulator.

14. The cross compound synchronous condenser of claim 13, wherein the second generator excitation system includes an automatic voltage regulator.

15. The cross compound synchronous condenser of claim 10, further comprising a first double acting thrust bearing coupled to the first generator and the motor.

16. The cross compound synchronous condenser of claim 15, wherein the first double acting thrust bearing includes a radial bearing.

17. The cross compound synchronous condenser of claim 15, further comprising a second double acting thrust bearing coupled to the second generator.

18. The cross compound synchronous condenser of claim 17, wherein the second double acting thrust bearing includes a radial bearing.

19. The cross compound synchronous condenser of claim 10, further comprising an oil heating system operable to heat a flow of lubricating oil and deliver the heated oil to the first generator and the second generator to provide lubrication.

20. A synchronous condenser for use in controlling reactive power on an electrical grid, the synchronous condenser comprising:
    a first generator;
    a motor mechanically coupled to the first generator and operable to drive the first generator to a synchronous speed;

a second generator electrically coupled to the first generator, the second generator rotating in response to the receipt of power from the first generator;

a first generator excitation system operable to vary a generator excitation voltage to control the reactive power produced by or used by the first generator; and a second generator excitation system operable to vary a generator excitation voltage to control the reactive power produced by or used by the second generator.

\* \* \* \* \*